United States Patent [19]

Holland

[11] 4,148,146
[45] Apr. 10, 1979

[54] INTERNAL THREAD GAGE
[76] Inventor: Robert W. Holland, 26639 Karen, Warren, Mich. 48081
[21] Appl. No.: 882,388
[22] Filed: Mar. 1, 1978
[51] Int. Cl.² ............................................. G01B 3/40
[52] U.S. Cl. ............................... 33/199 R; 33/147 M
[58] Field of Search ............ 33/199 R, 147 R, 147 T, 33/147 M, 172 R, 170, 143 R, 199 B, 179.5 R, 147 K

[56]          References Cited
        U.S. PATENT DOCUMENTS

| 1,950,912 | 3/1934 | Aronson | 33/199 X |
| 2,782,523 | 2/1957 | Swanson | 33/199 R |
| 2,937,453 | 5/1960 | Peterson | 33/199 R |

FOREIGN PATENT DOCUMENTS 287519  11/1928  United Kingdom ................ 33/199 R Primary Examiner—Richard E. Aegerter
Assistant Examiner—Willis Little
Attorney, Agent, or Firm—Gifford, Chandler, VanOphem, Sheridan & Sprinkle

[57] ABSTRACT

An improved internal thread gage comprising an elongated body and having an lineal distance gage mounted at one end thereof. A first arm having a first thread engaging member at one end is longitudinally adjustably secured to the elongated body so that the first end extends laterally outwardly from the body. A piston is longitudinally slidably positioned in a longitudinal bore in the body and is operatively coupled to the gage at one end. A second arm having a second thread engaging member at one end is laterally adjustably secured at its other end to the other end of the piston whereby both the lateral and longitudinal distances between the thread engaging members can be accurately preset.

10 Claims, 7 Drawing Figures

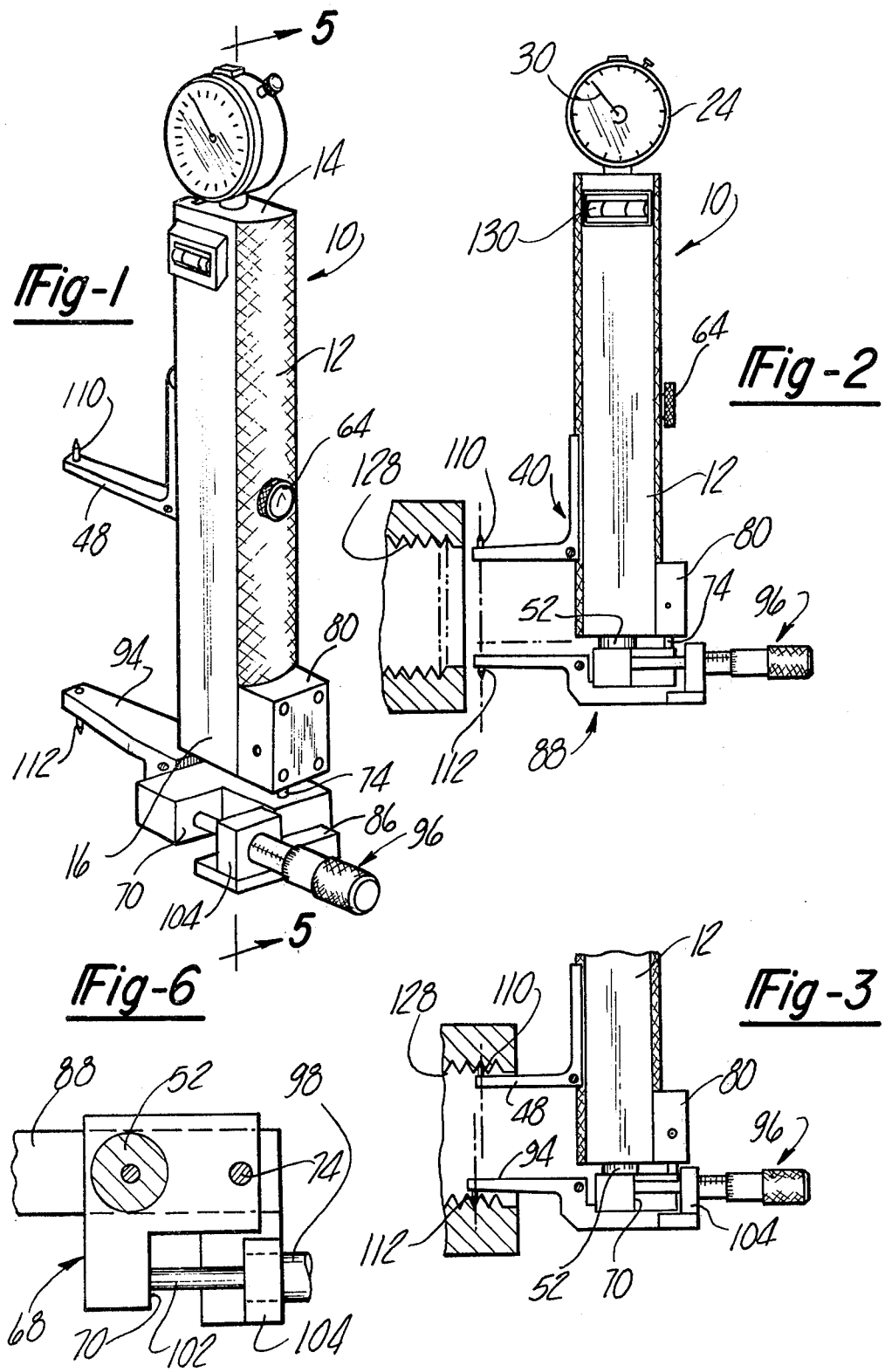

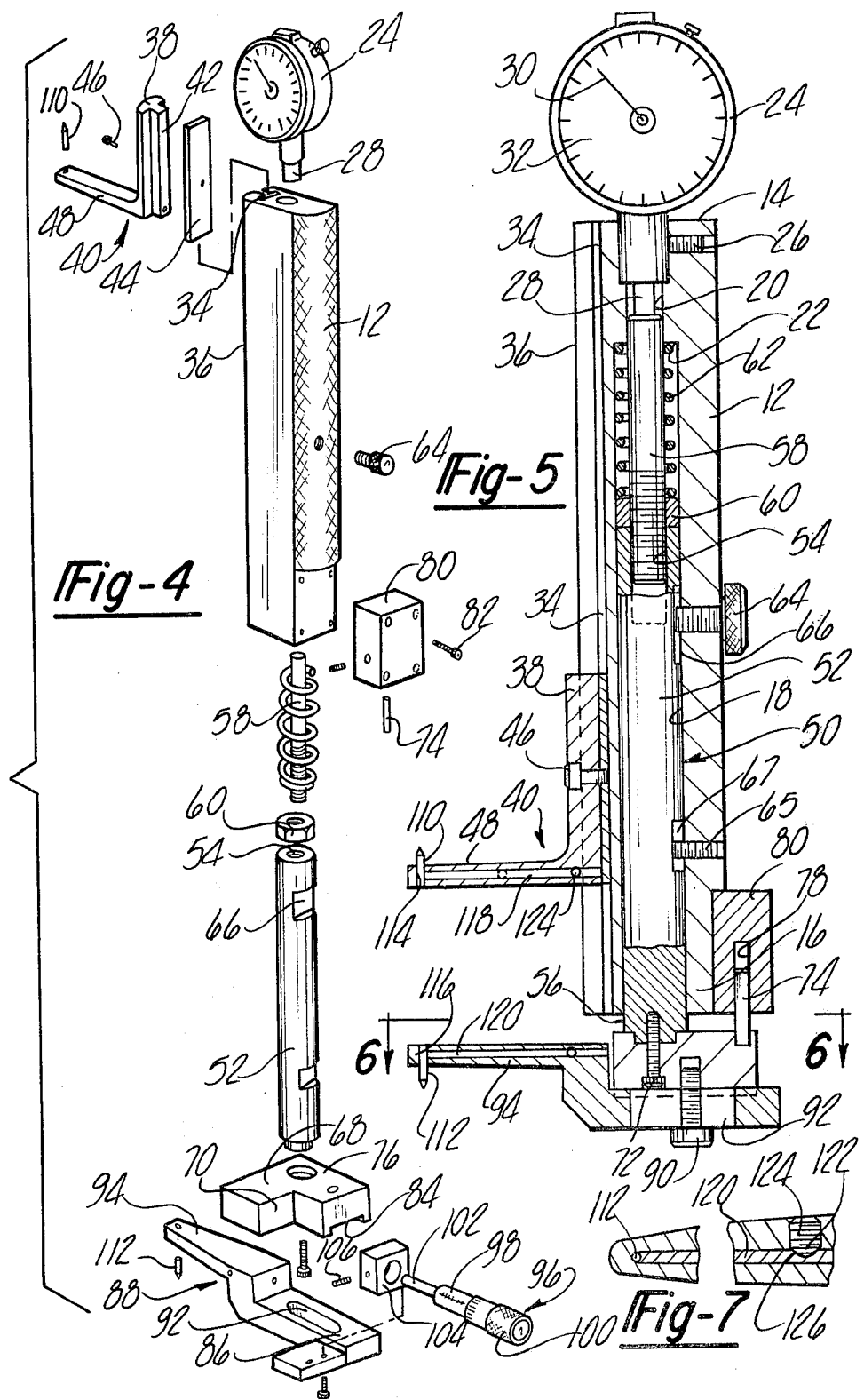

INTERNAL THREAD GAGE

BACKGROUND OF THE INVENTION

I. Field of the Invention

The present invention relates to an improved internal thread gage.

II. Description of the Prior Art

It is oftentimes necessary to accurately measure the pitch diameter of an internal thread. There are two previously known and commonly employed methods for measuring internal threads.

One previously known method for measuring internal threads requires the construction of two externally threaded plugs, commonly referred to as "go" and "no-go" plugs. The go plug is carefully machined to the lower end of the internal thread tolerance while, vice versa, the no-plug is carefully machined to the upper end of the internal thread towers. Consequently, if the go plug can be screwed into the internal thread being checked while the no-go plug cannot, the internal thread lies within the specified tolerance range.

The use of go and no-go plugs, however, is disadvantageous in that two separate plugs must be carefully machined in order to check a single internal thread. Although it would be possible to maintain a complete set of go and no-go plugs, conventional threads varying not only in diameter, but also in their pitch, thread size, number of starts and the like. Consequently, an even reasonably complete set of go and no-go plugs would require the manufacture and storage of tens of thousands of such plugs. For this reason, go and no-go plugs are conventionally constructed for a specific thread to be checked which is time consuming, requires special tooling and is, therefore, unduly expensive.

In lieu of the go and no-go plugs, there are previously known thread gages specifically designed to measure the pitch diameter of an internal thread. One such previously known thread gage is described in U.S. Pat. No. 3,827,157, which issued on Aug. 6, 1974, to Cass Kaifesh.

These previously known internal thread gages such as that described in the aforementioned patent conventionally include a body having a pair of arms extending outwardly from the body. A single thread engaging element is formed at the free end of one arm while a pair of spaced thread engaging elements are formed at the free end of the other arm. With the three thread engaging elements properly seated in the internal thread being checked, the pitch diameter is read from an indicator mounted to the body of the internal thread gage.

The disadvantage of this type of previously known internal thread gage, however, is that a new set of arms must be mounted to the gage for each different type of thread; i. e. threads with a different pitch, different number of starts or the like. Otherwise, the three point contact between the gage arms and the internal threads will not properly seat between the internal threads being checked and, therefore, will produce an inaccurate reading on the indicator. As a result, in addition to the gage body itself, it is necessary to obtain a plurality, oftentimes hundreds, of different thread engaging arms in order to measure different types of threads.

SUMMARY OF THE PRESENT INVENTION

The present invention overcomes the above mentioned disadvantages of the previously known internal thread gages by providing an improved thread gage in which substitution of the gage arms is not required.

In brief, the internal thread gage according to the present invention comprises an elongated body with a longitudinal throughbore and having a lineal distance indicator secured at one end of the throughbore. A first arm having a first thread engaging member is longitudinally slidably mounted to the body and includes means for locking the arm to the body at any desired longitudinal position.

A connecting member comprising an elongated rod is longitudinally slidably mounted in the housing throughbore and is operatively coupled with the indicator means at one end. A second arm having a second thread engaging member at one end is laterally slidably mounted to the other end of the connecting member so that the arms extend laterally outwardly from the body and are substantially parallel and spaced from each other.

At appropriate adjustment means, such as a micrometer, controls the lateral position of the second arm relative to the connecting member and, when properly preset, the second arm is locked to the connecting member by a bolt.

The lateral adjustment between the second arm and connecting member enables the lateral distance between the thread engaging members to be accurately preset and locked in position the thread engaging members can properly seat or engage the internal thread to be checked regardless of the type of thread. The lateral distance between the engaging members is determined, of course, by standarized thread configurations for the internal threads to be checked.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIG. 1 is a perspective view showing the internal thread gage according to the present invention;

FIG. 2 is a front plan view showing the internal thread gage according to the present invention;

FIG. 3 is a fragmentary plan view showing the internal thread gage of the present invention engaging and measuring an internal thread;

FIG. 4 is an exploded perspective view illustrating the internal thread gage according to the present invention;

FIG. 5 is a longitudinal sectional view of the thread gage according to the present invention and taken substantially along line 5—5 in FIG. 1;

FIG. 6 is a fragmentary partial sectional view taken substantially along line 6—6 in FIG. 5; and FIG. 7 is a fragmentary sectional view taken substantially along line 7—7 in FIG. 5 and enlarged for clarity.

DETAILED DESCRIPTION OF THE PRESENT INVENTION

With reference to FIGS. 1, 2, 4 and 5, the internal thread gage 10 according to the present invention is thereshown and comprises an elongated body 12 with a upper end 14 and lower end 16. A longitudinal thrughbore 18 with a reduced diameter portion 20 at its upper end is formed through the body 12. The junction of the throughbore 18 with its reduced diameter portion 20 forms an annular abutment surface 22 near the upper end 14 of the body 12.

A lineal distance indicator or gage 24 is secured to the upper end 14 of the body 12 in any conventional fashion, such as by means of a set screw 26. The distance indicator 24 includes a movable member 28 the movement of which produces rotation of a pointer 30 around a dial 32 on the distance indicator 24. The dial 32 includes proper indicia around its periphery so that axial movement of the movable member 28 is accurately displayed by the pointer 30 on the dial 32. The movable member 28 extends downwardly into the body throughbore 18 and its actuation will be subsequently described.

A T-shaped slot 34 (FIGS. 4 and 5) is formed longitudinally along one side 36 of the body 12 so that the vertical leg of the T-shaped slot 34 is open through the side 36 of the body 12. One leg 38 of an L-shaped arm 40 includes a protruding portion 42 which is positioned within the vertical leg of the T-shaped slot 34 while an elongated plate 44 is longitudinally slidably positioned in the cross leg of the T-shaped slot 34. The leg 38 of the arm 40 is secured to the plate 44 by a suitable bolt 46. With the bolt 46 loosened, the arm 40 can be slid longitudinally along the side 30 of the body 12 while, conversely, with the bolt 46 tightened, the arm 40 is secured to the body 12 at the desired longitudinal position. The second leg 48 of the arm 40 extends laterally outwardly from the side 36 of the body 12.

Still referring to FIGS. 4 and 5, a connecting member 50 is longitudinally slidably mounted within the body longitudinal throughbore 18. More specifically, the connecting member 50 comprises a cylindrical rod 52 having a threaded axial bore 54 at its upper end and which is positioned within the housing throughbore 18 so that its lower end 56 protrudes outwardly from the bottom 16 of the housing 12. A stud 58 threadably engages the bore 54 while a lock nut 60 axially adjustably locks the stud 58 to the rod 52. A helical spring 62 is positioned around the stud 58 and abuts at its upper end against the annular abutment surface 22 and, at its lower end, against the nut 60. The spring 62 is under slight compression and thus urges the connecting member 50 downwardly in the body throughbore 18. The upper end of the stud 58, abuts against the lower end of the indicator movable member 28 so that longitudinal movement of the connecting member 50 in the bore 18 produces a corresponding distance indication on the indicator 24. Moreover, the separation of the connecting member 50 from the body 12 is prevented by means of an Allen screw 65 threadably journalled to the body 12 and having its inner end positioned within a channel 67 formed on the rod 52. A thumbscrew 64 is also threadably journaly to the body 12 with its inner end positioned within a channel 66 on the rod 52 so that upon tightening of the thumbscrew 64, the rod 52 is temporarily locked against axial movement.

With reference to FIGS. 4–6, a generally L-shaped block 68 having an abutment surface 70 is connected to the lower axial end 56 of the rod 52 by appropriate means, such as a bolt 72. A pin 74 is secured to the upper end 76 of the block 68 so that with the block 68 secured to the rod 52, the axis of the pin 74 is parallel to but spaced from the axis of the rod 52. The pin 74 is longitudinally slidably received within a bore 78 formed in a guide block 80. The guide block 80 is secured to the bottom of the body 12 by bolts 82 or the like, and, via its engagement with the pin 74 prevents rotation of either the block 68 or the rod 52.

A rectangular channel 84 is formed on the bottom side of block 68 and laterally slidably receives a portion 86 of a second arm 88. The arm 88, however, can be locked in any desired lateral position with respect to the block 68 by tightening a bolt 90 which extends through a slot 92 in the arm portion 86 and threadably engages the block 68. The arm 88 also includes an outwardly extending portion 94 which extends laterally outwardly away from the housing 12 and substantially parallel to both the channel 84 and the leg 48 of the first arm 40.

The lateral position of the second arm portion 94 with respect to the first arm leg 48 is accurately preset by means of a micrometer 96 having a body 98, a rotatable handle 100 and an axially movable member 102. In the conventional fashion, the axial position of the movable member 102 is controlled by rotation of the handle 100 and accurately indicated by suitable indicia on the micrometer body 98.

The micrometer body 98 is secured to the second arm 88 by suitable means, such as a mounting block 104 and set screw 106 so that the axis of the micrometer movable member 102 is substantially parallel to both the channel 84 and the laterally outwardly extending portions of the arms 40 and 88. In addition the free end of the micrometer movable member 102 is in alignment with and abuts against the abutment surface 70 on the block 68. Thus, to laterally space the laterally extending portions of the arms 40 and 88, the bolt 90 is first loosened and the micrometer 96 is preset to the desired distance "X." Thereafter, the second arm 88 is moved until the free end of the micrometer movable member 102 abuts against the surface 70 of the mounting block 68 after which the bolt 90 is tightened to lock the arm 88 to the mounting block 68.

With reference now particularly to FIGS. 5 and 7, a pair of pointed thread engaging members 110 and 112 are respectively positioned in bores 114 and 116 at the free end of the laterally extending portions 48 and 94 of the arms 40 and 88. The bores 114 and 116 are substantially parallel to the longitudinal axis of the housing 12. To secure the thread engaging members 110 and 112 within their respective bores, a pair of elongated rods 118 and 120 are positioned in lateral bores formed respectively through the arm portions 48 and 94 so that one end of each locking rod abuts against its respective thread engaging member. A cam surface 122 (FIG. 7) is formed at the other end of each locking rod 118 and 120 which cooperates with a set screw 124 having a tapered nose 126. Thus, upon tightening of the set screw 124, the set screw 124 urges the rods 118 and 120 lockingly against the respective thread engaging members 110 and 116.

With reference now particularly to FIGS. 2 and 3, the operation of the internal thread gage 10 according to the present invention will be described. In FIG. 2, the micrometer 96 is initially set for zero lateral displacement so that the thread engaging members 110 and 112 are in alignment with each other. The distance between the pointed ends of the thread engaging elements 110 and 112 are preset by slidably adjusting the first arm 40 along the body 12 and by a suitable micrometer (not shown). The arm 40 is then locked to the body 12 by tightening the bolt 46 and the distance indicator 24 is zeroed in the well known fashion.

The lateral offset "X" between the same or adjacent threads of a threaded bore 128 to be checked is then determined from conventional machinists' handbooks or otherwise and the micrometer 96 is then adjusted to the calculated lateral offset. The free end of the micrometer movable member 102 is then moved into engagement with the abutment surface 70 and the second arm 88 is locked to the connecting block 68 by the bolt 90 as best shown in FIG. 3. The arms 40 and 88 are then compressed together and inserted into the thread 128 to be checked (FIG. 3). The lateral offset between the thread engaging members 110 and 112 as set by the micrometer 96 enables the members 110 and 112 to properly seat within the gullies of the thread 128 being checked so that an accurate reading can be read from the distance indicator 24. To prevent skewing of the gage 10 relative to the thread 128 being checked, a bubble type indicator 130 is preferably laterally attached to the body 12. In the conventional fashion, the distance indicator 24 will indicate the deviation of the thread 128 being checked from the distance initially preset between the thread engaging members 110 and 112 rather than a direct reading of the pitch diameter. If the thread 128 is within the predetermined tolerance range, the pointer 30 on the indicator 24 will likewise remain within the tolerance range.

Due to the two point contact between the thread engaging members 110 and 112 and the thread 128 being checked, only two thread engaging members 110 and 112 are required to check a plurality of different types of threads and thread sizes. For special types of threads, for example an Acme thread, special thread engaging members (not shown) may be required. Substitution of the thread engaging members 110 and 112, however, can be rapidly and simply accomplished by simple loosening and tightening the set screws 124 (FIG. 7).

From the foregoing, it can be seen that the internal thread gage 10 according to the present invention provides a substantial improvement over the previous known internal thread gages and their required three point contact between the gage and the thread being checked. Most significantly, only a single pair of thread engaging elements 110 and 112 are needed to check a wide range of different types of internal threads which has been heretofore impossible with the previously known internal thread gages.

Having described my invention, however, many modifications thereto will become apparent to those skilled in the art to which it pertains without deviation from the spirit of the invention as defined by the scope of the appended claims.

I claim:

1. An internal thread gage comprising:
    an elongated body;
    lineal distance indicator means secured to said body, said indicator means having a movable member the movement of which provides a proportionate visual indication on the indicator means;
    a first arm and means for longitudinally adjustably securing one end of said first arm to the body so that said first arm extends laterally outwardly from the body, said first arm having a first thread engaging member attached to its other end;
    a connecting member longitudinally slidably disposed in said body and having one end operatively coupled with the indicator means movable member;
    a second arm, said second arm having a second thread engaging member attached to one end;
    means for laterally adjustably locking the other end of the second arm to the other end of the connecting member so that said second arm extends laterally outwardly from said body and so that the lateral distance between the thread engaging members can be adjustably preset; and
    wherein said laterlly locking means further comprises micormeter means operatively connected between said connecting member and second arm for presetting the lateral distance between said thread engaging members.

2. The invention as defined in claim 1 wherein said connecting member comprises an elongated rod longitudinally slidably mounted in a throughbore formed through said body, a first end of said rod operatively engaging said indicator means movable member.

3. The invention as defined in claim 2 wherein said last mentioned means comprises a mounting block secured to the second end of said rod, said block having a lateral channel formed therein which laterally slidably receives a portion of the second arm.

4. The invention as defined in claim 2 and including resilient means for urging said rod outwardly from said throughbore.

5. The invention as defined in claim 1 wherein said first arm is L-shaped and wherein said means for securing said first arm to said body comprises a plate slidably mounted in a slot formed longitudinally along and open to one side of said body and a bolt extending through one leg of the L-shaped first member and threadably engaging said plate.

6. The invention as defined in claim 1 and further comprising means for detachably securing the thread engaging members to their respective arms, each of said last mentioned means comprising an elongated rod laterally slidably positioned in a bore formed through the respective arm, one end of said rod being adapted to abut against one thread engaging member and a tapered cam surface formed on the other end of the rod, and a threaded member having a tapered nose threadably engaging the arm so that the nose engages the cam surface and so that upon tightening of the threaded member, the threaded member lockingly urges the rod against the thread engaging member.

7. An internal thread gage comprising:
    an elongated body;
    a lineal distance indicator means secured to said body, said indicator means having a movable member the movement of which provides a proportionate visual indication on the indicator means;
    a first arm and means for longitudinally adjustably securing one end of said first arm to the body so that said first arm extends laterally outwardly from the body, said first arm having a first thread engaging member attached to its other end;
    a connecting member longitudinally slidably disposed in said body and having one end operatively coupled with the indicator means movable member;
    a second arm, said second arm having a second thread engaging member attached to one end;
    means for laterally adjustably locking the other end of the second arm to the other end of the connecting member so that said second arm extends laterally outwardly from said body and so that the lateral distance between the thread engaging members can be adjustably preset;
    wherein said connecting member comprises an elongated rod longitudinally slidably mounted in a throughbore formed through said body, a first end of said rod operatively engaging said indicator means movable member and means for laterally slidably mounting said second arm to a second end of the rod; and wherein said last mentioned means comprises a mounting block secured to the second end of said rod, said block having a lateral channel formed therein which laterally slidably receives a portion of the second arm.

8. The invention as defined in claim 7 and including resilient means for urging said rod outwardly from said throughbore.

9. An internal thread gage comprising:

an elongated body;

lineal distance indicator means secured to said body, said indicator means having a movable member the movement of which provides a proportionate visual indication on the indicator means;

a first arm and means for longitudinally adjustably securing one end of said first arm to the body so that said first arm extends laterally outwardly from the body, said first arm having a first thread engaging member attached to its other end;

a connecting member longitudinally slidably disposed in said body and having one end operatively coupled with the indicator means movable member;

a second arm, said second arm having a second thread engaging member attached to one end;

means for laterally adjustably locking the other end of the second arm to the other end of the connecting member so that said second arm extends laterally outwardly from said body and so that the lateral distance between the thread engaging members can be adjustably preset; and wherein said first arm is L-shaped and wherein said means for securing said first arm to said body comprises a plate slidably mounted in a slot formed longitudinally along and open to one side of said body and a bolt extending through one leg of the L-shaped first member and threadably engaging said plate.

10. An internal thread gage comprising:

an elongated body;

lineal distance indicator means secured to said body, said indicator means having a movable member the movement of which provides a proportionate visual indication on the indicator means;

a first arm and means for longitudinally adjustably securing one end of said first arm to the body so that said first arm extends laterally outwardly from the body, said first arm having a first thread engaging member attached to its other end;

a connecting member longitudinally slidably disposed in said body and having one end operatively coupled with the indicator means movable member;

a second arm, said second arm having a second thread engaging member attached to one end;

means for laterally adjustably locking the other end of the second arm to the other end of the connecting member so that said second arm extends laterally outwardly from said body and so that the lateral distance between the thread engaging members can be adjustably preset; and means for detachably securing the thread engaging members to their respective arms, each of said last mentioned means comprising an elongated rod laterally slidably positioned in a bore formed through the respective arm, one end of said rod being adapted to abut against one thread engaging member and a tapered cam surface formed on the other end of the rod, and a threaded member having a tapered nose threadably engaging the arm so that the nose engages the cam surface and so that upon tightening of the threaded member, the threaded member lockingly urges the rod against the thread engaging member.

* * * * *

UNITED STATES PATENT AND TRADEMARK OFFICE
CERTIFICATE OF CORRECTION

PATENT NO. : 4,148,146
DATED : April 10, 1979
INVENTOR(S) : Robert W. Holland

It is certified that error appears in the above-identified patent and that said Letters Patent are hereby corrected as shown below:

Column 2, line 65, delete "thrugh-" and insert --through- -- therefor;

Column 6, line 3, delete "laterlly" and insert --laterally-- therefor;
Column 6, line 4, delete "micormeter" and insert --micrometer-- therefor.

Signed and Sealed this

Eleventh Day of September 1979

[SEAL]

Attest:

Attesting Officer

LUTRELLE F. PARKER
*Acting Commissioner of Patents and Trademarks*